US 11,408,790 B2

(12) United States Patent
Le Henaff et al.

(10) Patent No.: US 11,408,790 B2
(45) Date of Patent: Aug. 9, 2022

(54) FLUID CIRCUIT MONITORING SYSTEM FOR DETERMINING WHEN TO PERFORM PREVENTATIVE MAINTENANCE

(71) Applicant: OVH, Roubaix (FR)

(72) Inventors: Guillaume Le Henaff, Roubaix (FR); Matthieu Hennekinne, Lille (FR); Jules Hermann Bonenfant, Lys Lez Lannoy (FR); Christophe Maurice Thibaut, Houplin Ancoisne (FR)

(73) Assignee: OVH, Roubaix (FR)

( * ) Notice: Subject to any disclaimer, the term of this patent is extended or adjusted under 35 U.S.C. 154(b) by 605 days.

(21) Appl. No.: 16/453,036

(22) Filed: Jun. 26, 2019

(65) Prior Publication Data

US 2020/0003648 A1 Jan. 2, 2020

(30) Foreign Application Priority Data

Jun. 28, 2018 (EP) .................................... 18315012

(51) Int. Cl.
*G01L 19/00* (2006.01)
*F28F 27/00* (2006.01)
*G01L 13/00* (2006.01)
*G01L 19/14* (2006.01)

(52) U.S. Cl.
CPC .......... *G01L 19/0084* (2013.01); *F28F 27/00* (2013.01); *G01L 13/00* (2013.01); *G01L 19/0092* (2013.01); *G01L 19/147* (2013.01)

(58) Field of Classification Search
None
See application file for complete search history.

(56) References Cited

U.S. PATENT DOCUMENTS 5,287,746 A * 2/1994 Broden ............... G01L 19/0663
73/756
5,533,765 A * 7/1996 Williamson ........ F16L 19/0212
285/190

(Continued)

FOREIGN PATENT DOCUMENTS

CA        2261202 A1    1/1998
DE   102012220826 A1    6/2013

(Continued)

OTHER PUBLICATIONS

European Search Report with regard to the counterpart EP Patent Application 18315012.7 dated Jan. 3, 2019.

(Continued)

*Primary Examiner* — Brandi N Hopkins
*Assistant Examiner* — Nigel H Plumb
(74) *Attorney, Agent, or Firm* — BCF LLP (57) ABSTRACT

A fluid circuit monitoring system for monitoring a fluid circuit includes a pressure sensor for sensing a pressure of fluid flowing in the fluid circuit and an interface member fluidly communicating the fluid circuit to the pressure sensor. The fluid circuit monitoring system may be used to monitor a pressure or temperature differential between an inlet and outlet of the fluid circuit and determine a fluid flow rate of the fluid circuit. The pressure differential, temperature differential, or fluid flow rate can be logged and used to determine if preventative maintenance should be performed on the fluid circuit.

20 Claims, 11 Drawing Sheets

(56) References Cited

U.S. PATENT DOCUMENTS

| | | | |
|---|---|---|---|
| 6,361,687 B1* | 3/2002 | Ford | F16L 37/248 |
| | | | 210/232 |
| 7,162,927 B1 | 1/2007 | Selvan et al. | |
| 7,799,203 B2* | 9/2010 | Ieda | G01N 33/007 |
| | | | 73/23.31 |
| 7,896,834 B2* | 3/2011 | Smisson, III | A61M 5/44 |
| | | | 604/67 |
| 8,375,800 B2* | 2/2013 | Lesnau, IV | F16J 15/064 |
| | | | 73/744 |
| 9,353,998 B2* | 5/2016 | Willis | F28F 9/02 |
| 9,746,391 B2* | 8/2017 | Gagne | G01N 27/10 |
| 9,795,065 B2* | 10/2017 | Shelnutt | H05K 7/20781 |
| 2013/0133872 A1* | 5/2013 | Campbell | H05K 7/20281 |
| | | | 165/287 |
| 2016/0223108 A1 | 8/2016 | Jencks et al. | |
| 2017/0181328 A1 | 6/2017 | Shelnutt et al. | |
| 2017/0276275 A1 | 9/2017 | Beemer et al. | |

FOREIGN PATENT DOCUMENTS

| | | |
|---|---|---|
| EP | 3276242 A1 | 1/2018 |
| WO | 2011126579 A1 | 10/2011 |
| WO | 2017111992 A1 | 6/2017 |
| WO | 2017135992 A1 | 8/2017 |
| WO | 2017155939 A1 | 9/2017 |

OTHER PUBLICATIONS

European Search Report with regard to the counterpart EP Patent Application 18315012.7 dated Mar. 19, 2019.

Valenti, "Heat exchangers: tougher tests and better materials spur new uses", Mechanical Engineering—CIME, 113, p. 60(6). Retrieved from https://dialog.proquest.com/professional/docview/1045746700?accountid=157282, pdf 8 pages.

"Heat transfer fluid leaks: Break the fire triangle: Extreme processing temperatures present the greatest risk. know where leaks are most likely to occur and how to prevent them" (2010) Chemical Engineering, 117(13), 26. Retrieved from https://dialog.proquest.com/professional/docview/1082478520?accountid=157282, pdf 12 pages.

Kheirabadi, "Design of a Thermal Contact Liquid Cooling System for Military Server Electronics", Dalhousie University, Halifax, Nova Scotia, 2016, 144 pages.

"Liquid Cooling for Data Centers", System Overview, Chilldyne, www.chilldyne.com, pdf 6 pages.

English Abstract of DE102012220826 retrieved on Espacenet on Jun. 25, 2019.

* cited by examiner

FLUID CIRCUIT MONITORING SYSTEM FOR DETERMINING WHEN TO PERFORM PREVENTATIVE MAINTENANCE

CROSS-REFERENCE TO RELATED APPLICATION(S)

This United States Non-Provisional patent application relies for priority on European Patent Application Serial No. EP 18315012.7, filed on Jun. 28, 2018, the entire content of which is incorporated herein by reference.

FIELD OF TECHNOLOGY

The present technology relates generally to fluid circuit monitoring systems.

BACKGROUND

Heat exchangers often include a fluid circuit within which a refrigerant fluid (e.g., water) is made to flow in order to cool a given component or another medium such as air. For example, servers which are housed in server racks in data centers often include such heat exchangers such as water blocks for cooling a given component of the server (e.g., a central processing unit).

The fluid circuit of such a heat exchanger is susceptible to accumulation of residue (e.g., calcium deposits) therein which negatively affects the cooling performance of the heat exchanger. Maintenance of the fluid circuit must thus be performed regularly. However, such maintenance is typically reactive in nature and performed only once the fluid circuit requires immediate maintenance (e.g., is substantially blocked). In the context of a data center, this can cause a severe slow down of service since a thorough maintenance must be performed to repair the fluid circuit. Monitoring the fluid circuit of heat exchangers such as by monitoring the pressure along the fluid circuit is thus advantageous. While certain tools for monitoring pressure can be used to that end, such monitoring is usually conducted selectively by an operator and allows only an instant reading of the pressure.

Moreover, measuring the pressure of the fluid within the fluid circuit requires routing fluid from the fluid circuit to a pressure sensor. While this can be achieved, the fluid connections connecting the fluid circuit to the pressure sensor are often subject to leaks which can impart errors in the pressure readings, in particular where the fluid circuit operates on low pressure and thus even a minor leak causes a significant pressure reading error.

Thus there is a desire for a fluid circuit monitoring system that alleviates at least in part some of these drawbacks.

SUMMARY

It is an object of the present technology to ameliorate at least some of the inconveniences present in the prior art.

According to one aspect of the present technology, there is provided a fluid circuit monitoring system for monitoring a fluid circuit. The fluid circuit monitoring system includes: a pressure sensor for sensing a pressure of fluid flowing in the fluid circuit, the pressure sensor including a sensing port configured to receive fluid therein; and an interface member fluidly communicating the fluid circuit to the pressure sensor. The interface member includes a channel having a channel inlet in fluid communication with the fluid circuit and configured to be coupled thereto via tubing; and a channel outlet connected to the sensing port of the pressure sensor. The fluid circuit monitoring system also includes a control unit operatively connected to the pressure sensor for receiving, from the pressure sensor, a signal representative of the pressure measured by the pressure sensor.

In some embodiments of the present technology, the pressure sensor is a pressure differential sensor. The sensing port is a first sensing port. The pressure differential sensor includes a second sensing port configured to receive fluid therein. The channel is a first channel. The channel inlet and the channel outlet are a first channel inlet and a first channel outlet. The first channel inlet is fluidly connected at a first location of the fluid circuit. The interface member includes a second channel having: a second channel inlet fluidly connected at a second location of the fluid circuit and configured to be coupled thereto via tubing; and a second channel outlet connected to the second sensing port of the pressure differential sensor. The signal received by the control unit, from the pressure differential sensor, is representative of a pressure differential between the first location and the second location of the fluid circuit as measured by the pressure differential sensor.

In some embodiments of the present technology, the channel has outwardly-expanding tapered end portions for sealingly engaging the sensing port of the pressure sensor and the tubing.

In some embodiments of the present technology, a resin is applied at an interface between the interface member and the pressure sensor.

In some embodiments of the present technology, the fluid circuit monitoring system also includes a printed circuit board (PCB). The interface member is supported by the PCB. The pressure sensor is mounted to and in communication with the PCB. The control unit is in communication with the PCB. The fluid circuit monitoring system also includes a housing supporting the PCB and at least partly enclosing the PCB, the pressure sensor and the interface member therein.

In some embodiments of the present technology, the interface member is integrally formed with the housing.

In some embodiments of the present technology, the interface member extends from a first end to a second end. The first end of the interface member is abutted by the pressure sensor. The second end of the interface member is abutted by the housing such that the interface member is collaboratively retained in place by the pressure sensor and the housing.

In some embodiments of the present technology, the fluid circuit monitoring system also includes a temperature sensing unit for sensing a temperature of fluid circulating in the fluid circuit. The temperature sensing unit includes a first temperature probe positioned at the first location of the fluid circuit and a second temperature probe positioned at the second location of the fluid circuit. The control unit is operatively connected to the first and second temperature probes for receiving, from the first and second temperature probes, signals representative of fluid temperatures at the first and second locations of the fluid circuit. The control unit is operable to determine, based on the fluid temperatures at the first and second locations, a temperature differential between the first and second locations of the fluid circuit.

In some embodiments of the present technology, the control unit is operable to determine, based on the pressure differential and the temperature differential, a fluid flow rate within the fluid circuit. The control unit is also operable to record the determined fluid flow rate.

In some embodiments of the present technology, the control unit is operable to determine, based on recorded values of the fluid flow rate, if the fluid circuit requires maintenance.

In some embodiments of the present technology, the first channel inlet and the second channel inlet are aligned along a generally horizontal axis. The first channel outlet and the second channel outlet are aligned along a generally vertical axis.

In some embodiments of the present technology, the channel inlet has a first diameter and the channel outlet has a second diameter. The first diameter is greater than the second diameter.

According to another aspect of the present technology, there is provided a heat exchange system. The heat exchange system includes a heat exchanger. The heat exchanger includes a heat exchanging body and a fluid circuit at least partly extending within the heat exchanging body. The fluid circuit has an inlet for receiving fluid within the fluid circuit and an outlet for expelling fluid from the fluid circuit. The heat exchange system also includes a fluid circuit monitoring system for monitoring the fluid circuit of the heat exchanger. The fluid circuit monitoring system includes a pressure sensor for sensing a pressure of fluid flowing in the fluid circuit, and an interface member fluidly communicating the fluid circuit to the pressure sensor. The pressure sensor includes a sensing port configured to receive fluid therein. The interface member includes a channel having: a channel inlet in fluid communication with the fluid circuit and configured to be coupled thereto via tubing; and a channel outlet connected to the sensing port of the pressure sensor. The fluid circuit monitoring system also includes a control unit operatively connected to the pressure sensor for receiving, from the pressure sensor, a signal representative of the pressure measured by the pressure sensor.

In some embodiments of the present technology, the heat exchanger is a water block. The heat exchanging body of the water block is configured to be in contact with a component to be cooled. The fluid circuit includes a conduit defined by the heat exchanging body of the water block.

In some embodiments of the present technology, the pressure sensor is a pressure differential sensor. The sensing port is a first sensing port. The pressure differential sensor includes a second sensing port configured to receive fluid therein. The channel is a first channel. The channel inlet and the channel outlet are a first channel inlet and a first channel outlet. The first channel inlet is fluidly connected at the inlet of the fluid circuit. The interface member includes a second channel having a second channel inlet fluidly connected at the outlet of the fluid circuit and configured to be coupled thereto via tubing; and a second channel outlet connected to the second sensing port of the pressure differential sensor. The signal received by the control unit, from the pressure differential sensor, is representative of a pressure differential between the inlet and the outlet of the fluid circuit as measured by the pressure differential sensor.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
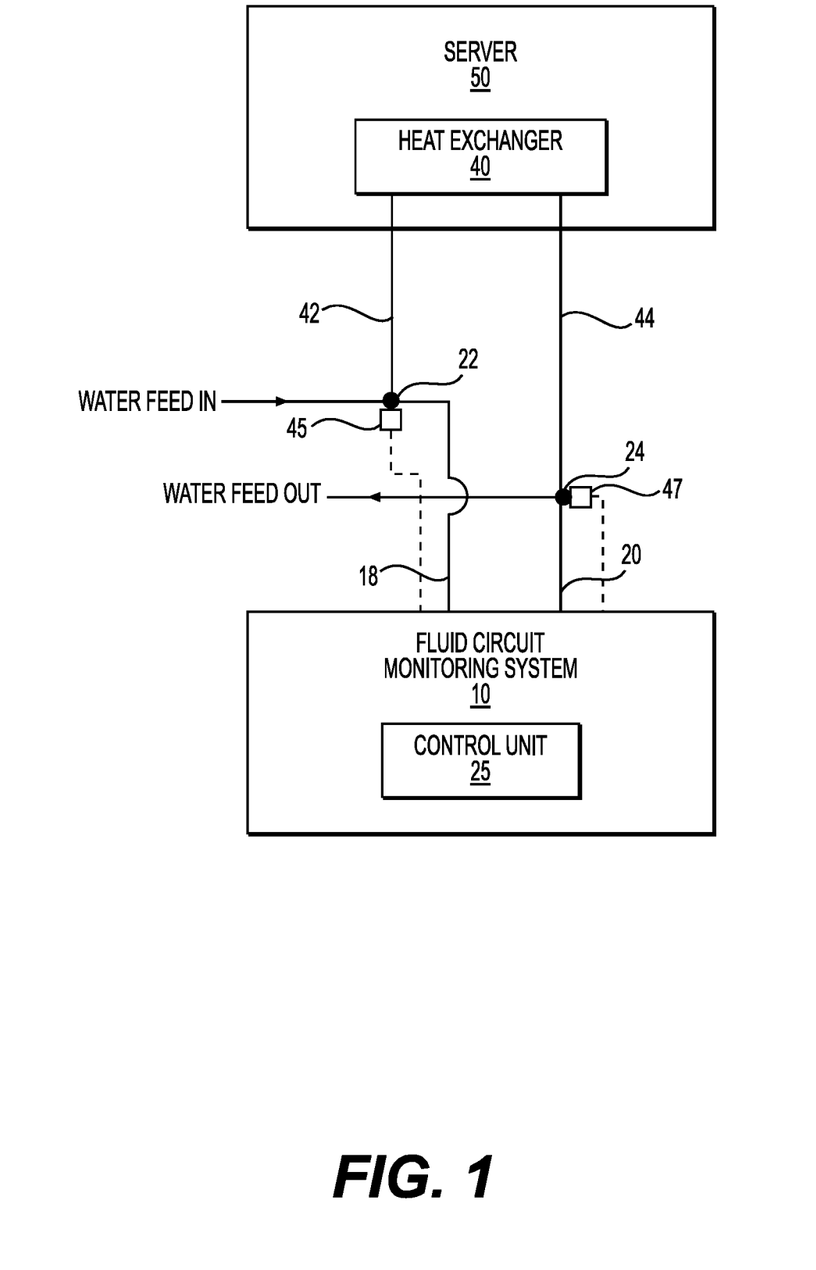
FIG. 1 is a block diagram showing a fluid circuit monitoring system in connection with a fluid circuit.
Figure 13A:
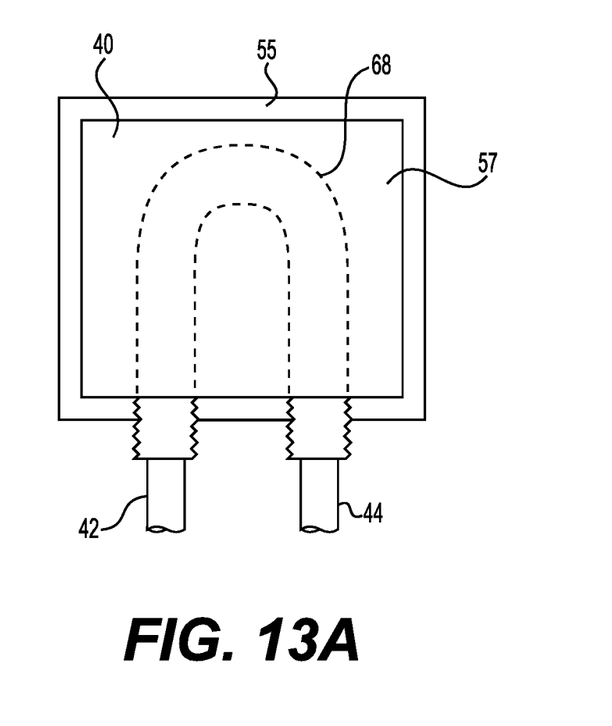
FIG. 13A is a top plan view of a water block defining part of the fluid circuit monitored by the fluid circuit monitoring system of FIG. 1.
Figure 13B:
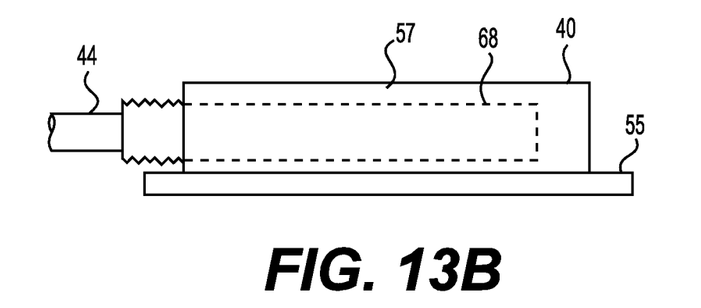
FIG. 13B is a right side elevation view of the water block of FIG. 13A.

With reference to FIG. 1, a fluid circuit monitoring system 10 is connected to a fluid circuit of a heat exchanger 40 for monitoring thereof. In this embodiment, the heat exchanger 40 is housed within a server 50. More specifically, in this example, as shown in FIGS. 13A and 13B, the heat exchanger 40 is a water block for cooling a server component 55 in contact with a heat exchanging body 57 of the water block. For instance, the component 55 may be a central processing unit (CPU), a graphics processing unit (GPU) or any other suitable component of the server 50 (e.g., network processing unit (NPU), field-programmable gate array (FPGA), redundant array of independent disks (RAID), random access memory (RAM), hard disk drive (HDD), solid state drive (SSD), etc.). Thus, in this example, the fluid circuit monitored by the fluid circuit monitoring system includes a conduit 68 (shown in hidden lines) extending within and defined by the heat exchanging body 57. Fluid flows within the conduit 68 to cool the server component 55 in contact with the water block.

As will be described in detail below, the fluid circuit monitoring system 10 is designed to continuously monitor certain parameters of the fluid circuit of the heat exchanger 40 and, on the basis of these parameters, determine a condition of the fluid circuit or otherwise communicate the value of the parameters to an operator. The operator can thus be made aware when the fluid circuit requires or will require maintenance and intervene accordingly if necessary.

Figure 2:
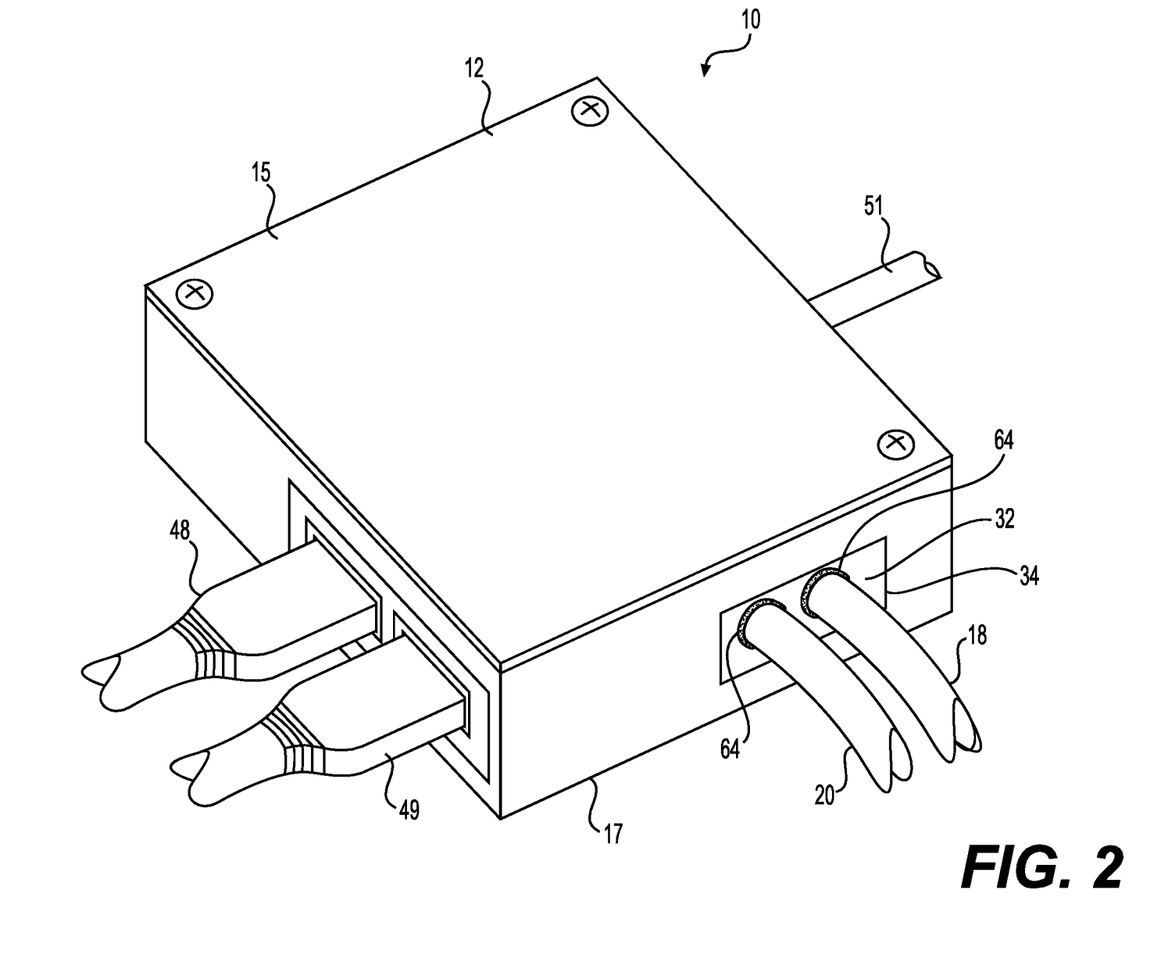
FIG. 2 is a top, right side perspective view of a sensing module of the fluid circuit monitoring system in accordance with an embodiment of the present technology.

As shown in FIG. 2, a sensing module of the fluid circuit monitoring system 10 is shown, including a housing 12 and a printed circuit board (PCB) 14 enclosed within the housing 12. The housing 12 includes a base 15 and a cover 17 that are affixed to one another to enclose therein the PCB 14 and other components mounted to the PCB 14. The PCB 14 is mounted to the base 15 via fasteners 19 (FIG. 4) that engage mounting apertures 59 provided on the PCB 14. The PCB 14 is enclosed between the base 15 and the cover 17 which are fastened to one another. The PCB 14 includes a non-conductive substrate and conductive tracks laminated onto the non-conductive substrate for electrically interconnecting a plurality of electronic components mounted to the PCB 14. Notably, the fluid circuit monitoring system 10 includes a pressure sensor 16 and a plurality of connectors 26, 28, 30 which are mounted to and in communication with the PCB 14 (i.e., electrically connected thereto) to allow communication between these components and the PCB 14. The fluid circuit monitoring system 10 also includes an interface member 32 that is supported by the PCB 14 and fluidly communicates the fluid circuit of the heat exchanger 40 to the pressure sensor 16, as will be described in more detail below.

Figure 5:
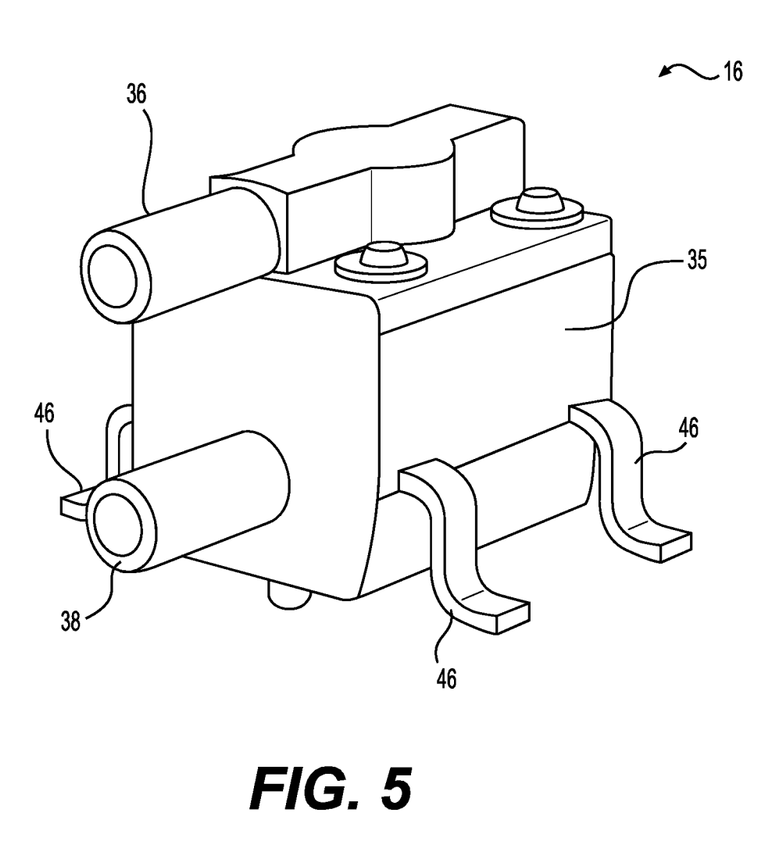
FIG. 5 is a top, left side perspective view of a pressure sensor of the sensing module of FIG. 2.

The pressure sensor 16 is configured to sense a pressure of fluid flowing in the fluid circuit of the heat exchanger 40. As shown in FIG. 5, the pressure sensor 16 has connector legs 46 that are soldered to the PCB 14 such as to mount the pressure sensor 16 to the PCB 14 as well as allow communication therebetween. In this embodiment, the pressure sensor 16 is a pressure differential sensor and can thus sense a pressure differential between two pressures. To that end, the pressure differential sensor 16 has two sensing ports 36, 38 configured to receive fluid therein. The sensing ports 36, 38 protrude from a body 35 of the pressure differential sensor 16 and have tapered ends (i.e., the ends of the sensing ports 36, 38 decrease in diameter).

Since the fluid flowing in the fluid circuit of the heat exchanger 40 is water in this embodiment, the pressure differential sensor 16 is a wet/wet sensor in that it is suitable for operating in contact with a liquid. It is contemplated that, in embodiments in which the fluid in the fluid circuit is not a liquid (e.g., a gas), the pressure differential sensor 16 could be a "dry" pressure sensor (i.e., not suitable for being exposed to water). In a manner that will be described in more detail below, the sensing ports 36, 38 are fluidly connected to the fluid circuit of the heat exchanger 40 at two different locations of the fluid circuit such as to sense the pressure differential of the fluid between the two selected locations of the fluid circuit.

The fluid circuit monitoring system 10 also includes a temperature sensing unit including two temperature probes 45, 47 for sensing the temperature of fluid flowing in the fluid circuit of the heat exchanger 40 at two locations thereof. Notably, as shown in FIG. 1, in this embodiment, the temperature probes 45, 47 are located at junctions 22, 24 respectively and thus sense the temperature of the fluid at the junctions 22, 24. The temperature probes 45, 47 are in communication with the PCB 14 via the connectors 26, 28. More particularly, the temperature probes 45, 47 are connected to the connectors 26, 28 via connecting links 48, 49 (FIG. 2) which are configured to be coupled with the connectors 26, 28. Notably, in this example, the temperature probes 45, 47 operate on the One-Wire protocol and the connectors 26, 28 have RJ45 Ethernet ports.

It is contemplated that, in some embodiments, rather than being located at the junctions 22, 24, the temperature probes 45, 47 could be located at the heat exchanger 40 itself (e.g., at a water block). This could provide more accurate monitoring of the temperature of the server 50.

Figure 6:
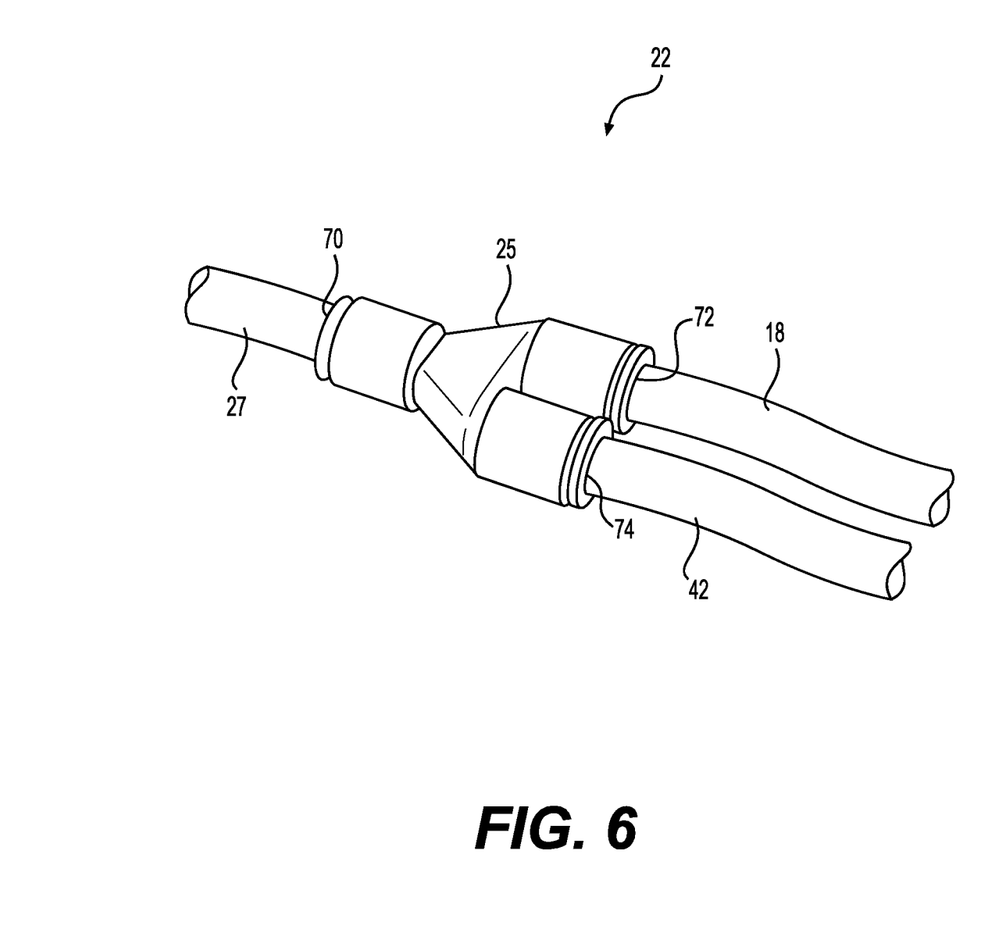
FIG. 6 is a top, right side perspective view of a junction to which the pressure sensor of FIG. 5 is fluidly connected.

The junctions 22, 24 are the locations at which the pressure and temperature of the fluid in the fluid circuit are gauged. An example of implementation of the junction 22 is shown at FIG. 6. As will be noted, the junction 22 is located at an inlet of the fluid circuit. That is, as shown in FIG. 1, the junction 22 is at a location where fluid has not yet entered the heat exchanger 40 (i.e., in a hydraulic line that feeds fluid into the heat exchanger 40). Conversely, the junction 24 is located at an outlet of the fluid circuit. That is, the junction 24 is at a location where fluid has exited the heat exchanger 40 (i.e., in a hydraulic line feeding fluid out of the heat exchanger 40). The junction 22 includes a Y tubing connector 25 having an inlet 70 and two outlets 72, 74. Tubing 27 is fluidly connected to the inlet 70 of the Y tubing connector 25 to feed fluid thereto from a fluid source. Tubing 42 is fluidly connected to the outlet 74 and feeds fluid to the heat exchanger 40. The tubing 18 fluidly connects the outlet 72 and the interface member 32 as will be described in greater detail below. It is understood that the junction 24 is configured similarly to the junction 22, with the tubing 20 fluidly connecting the junction 24 to the interface member 32 and tubing 44 (FIG. 1) fluidly connecting the junction 24 to the heat exchanger 40.

While FIG. 6 shows the configuration of the junction 22, it is understood that the junction 24 is configured similarly and will thus not be described in detail here.

As mentioned above, the interface member 32 fluidly communicates the fluid circuit of the heat exchanger 40 to the pressure differential sensor 16. With reference to FIGS. 7 to 11, the interface member 32 extends longitudinally from a first end 52 to a second end 54 and has two channels 56, 58 that extend from the first end 52 to the second end 54. Each of the channels 56, 58 has a channel inlet 60 at the first end 52 and a channel outlet 62 at the second end 54. The channel inlets 60 have a greater diameter than the channel outlets 62. In particular, each of the channels 56, 58 defines a shoulder 75 (FIG. 12A) at which the diameter of the channel reduces significantly and which serves to abut the tubing 18, 20. The shoulder 75 may be omitted in other embodiments.

In this embodiment, the channel inlets 60 are horizontally adjacent to one another while the channel outlets 62 are vertically adjacent to one another. That is, the channel inlets 60 are aligned along a generally horizontal axis while the channel outlets 62 are aligned a long a generally vertical axis. In particular, starting at the first end 52, the channel 56 transitions (at a transition zone) from extending horizontally adjacent to the channel 58 to extending vertically adjacent to the channel 58. To achieve this, in this example, at the transition zone, the channel 58 is offset horizontally toward a lateral side of the interface member 32 (away from the channel 56), while the channel 56 is offset horizontally toward the same lateral side (until the channels 56, 58 are laterally aligned) and vertically to be disposed directly above the channel 58. The channels 56, 58 may be configured in any other suitable way in other embodiments.

In use, the channel inlets 60 are in fluid communication with the fluid circuit of the heat exchanger 40. More specifically, as shown in FIGS. 1 and 2, the channel inlets 60 of the channels 56, 58 are coupled to the fluid circuit at the junctions 22, 24 via tubing 18, 20 respectively. That is, the tubing 18 is connected at one end to the channel inlet 60 of the channel 56 and at the opposite end to the junction 22, while the tubing 20 is connected at one end to the channel inlet 60 of the channel 58 and at the opposite end to the junction 24. For their part, the channel outlets 62 are connected to respective ones of the sensing ports 36, 38 of the pressure differential sensor 16. More specifically, the interface member 32 is mounted to the pressure differential sensor 16 such that the channel outlets 62 partly receive therein the protruding sensing ports 36, 38 of the pressure differential sensor 16.

As such, fluid from the junctions 22, 24 is routed to the interface member 32 via tubing 18, 20 and enters the channel inlets 60. The sensing ports 36, 38 which are at least partly received in the channel outlets 62 are thus subjected to the fluid pressure at the junctions 22, 24 such that the pressure differential sensor 16 generates a signal, that is transmitted to the PCB 14, representative of the pressure differential between the junctions 22, 24. Since the junctions 22, 24 are located at the inlet and outlet of the fluid circuit, the pressure differential between the junctions 22, 24 can be indicative of a condition of the fluid circuit. For instance, if a significant loss of pressure is recorded from the inlet to the outlet of the fluid circuit, this could be indicative that the fluid circuit requires maintenance (e.g., clearing deposits within the fluid circuit).

Furthermore, the pressure differential in combination with the temperature differential between the junctions 22, 24, as gauged by the temperature probes 45, 47, can be indicative of the fluid flow rate within the fluid circuit.

Figure 7:
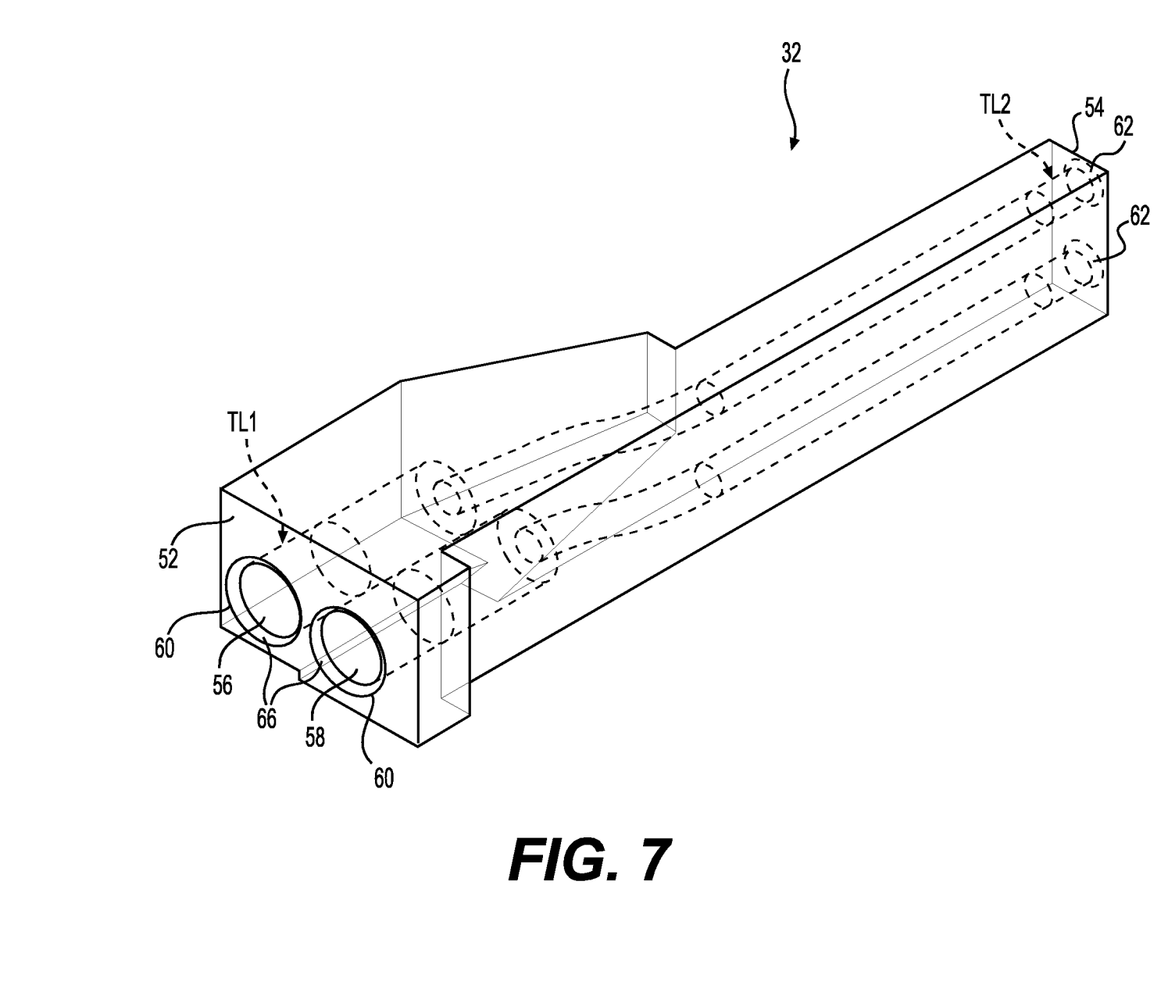
FIG. 7 is a front, right side perspective view of an interface member of the sensing module of FIG. 2 with channels thereof shown in hidden lines.
Figure 12A:
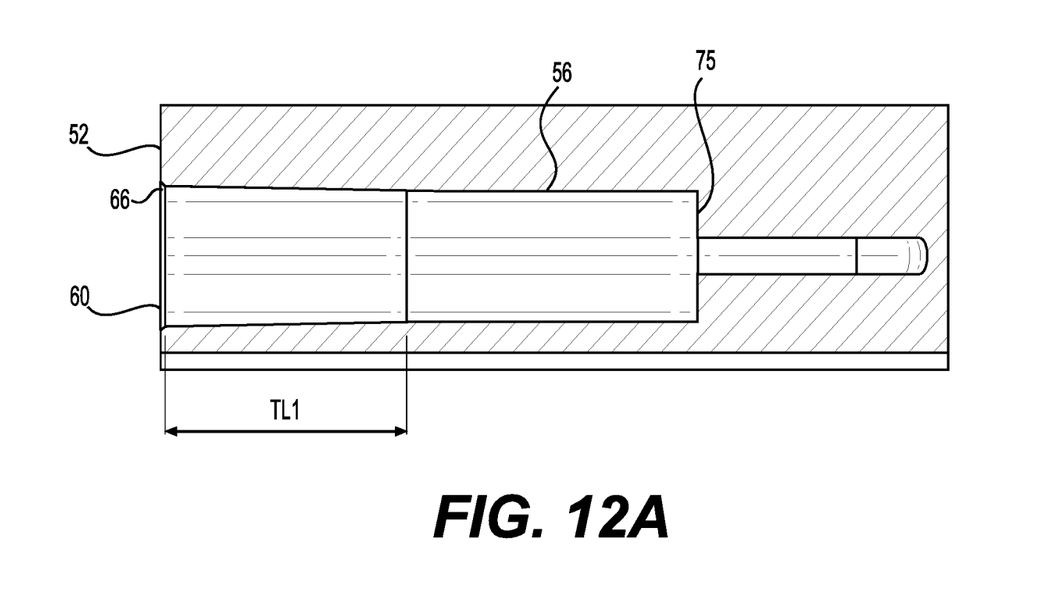
FIG. 12A is a cross-sectional view of the interface member taken along line 12A-12A in FIG. 8.
Figure 12B:
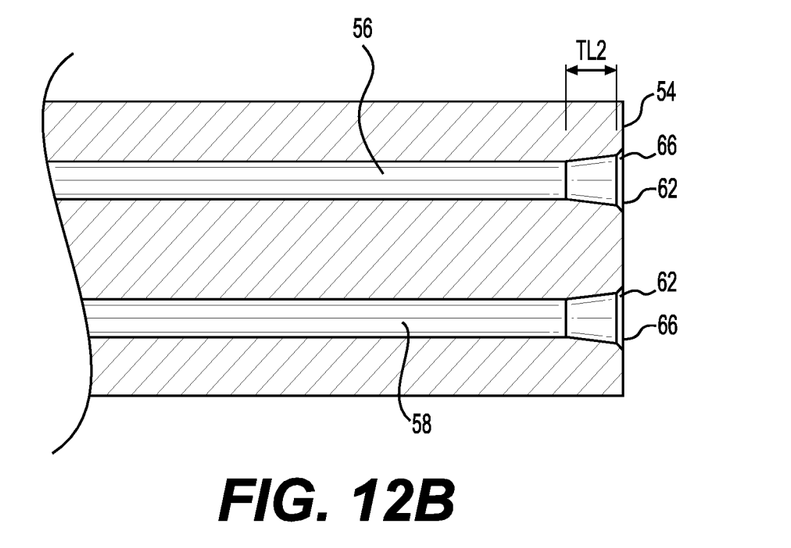
FIG. 12B is across-sectional view of the interface member taken along line 12B-12B in FIG. 10.

Each of the channels 56, 58 has outwardly-expanding tapered end portions TL1, TL2 for sealingly engaging the tubing 18, 20 and the sensing ports 36, 38. Notably, as shown in FIGS. 7, 12A and 12B, the tapered end portions TL1 extend along a given distance from the channel inlets 60 while the tapered end portions TL2 extend along a given distance from the channel outlets 62. The tapered end portions TL1, TL2 are "outwardly-expanding" in that a size (i.e., a diameter) of each of the tapered end portions TL1, TL2 is greatest nearest to the adjacent-most one of the ends 52, 54 of the interface member 32 such that the size of the tapered end portions TL1, TL2 gradually increases in an outward direction of each of the channel inlets 60 and the channel outlets 62.

The tapered end portions TL1, TL2 facilitate sealing between the tubing 18, 20 and the channel inlets 60 as well as between the sensing ports 36, 38 and the channel outlets 62. Notably, the inwardly-decreasing size of the tapered end portions TL1, TL2 creates a seal between the channels 56, 58 and the tubing 18, 20 and between the channels 56, 58 and the sensing ports 36, 38. In this manner, the risk of a leak occurring at the interface between the interface member 32 and the tubing 18, 20 as well as between the interface member 32 and the pressure differential sensor 16 is reduced.

In this embodiment, the interface member 32 is supported by the PCB 14 but is not secured thereto. Rather, the interface member 32 is fixed to the pressure differential sensor 16 only by its connection thereto (to the sensing ports 36, 38) and by the tubing 18, 20 connecting the interface member 32 to the fluid circuit of the heat exchanger 40. It is contemplated that, in alternative embodiments, the interface member 32 may be fixed to the PCB 14 in any suitable way (e.g., via an adhesive).

Figure 3:
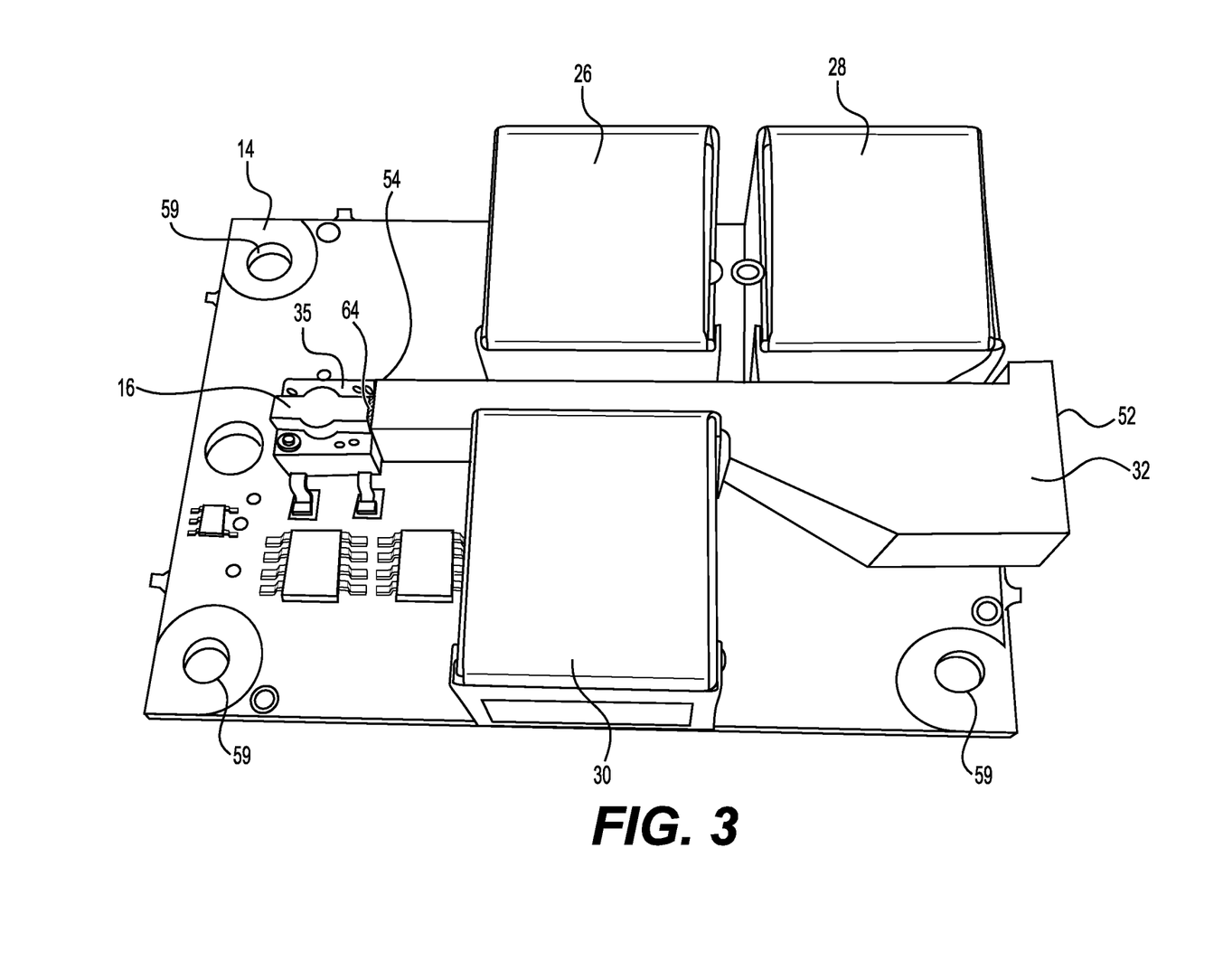
FIG. 3 is a top plan view of a printed circuit board (PCB) of the sensing module of FIG. 2 with other components of the sensing module mounted to the PCB.
Figure 4:
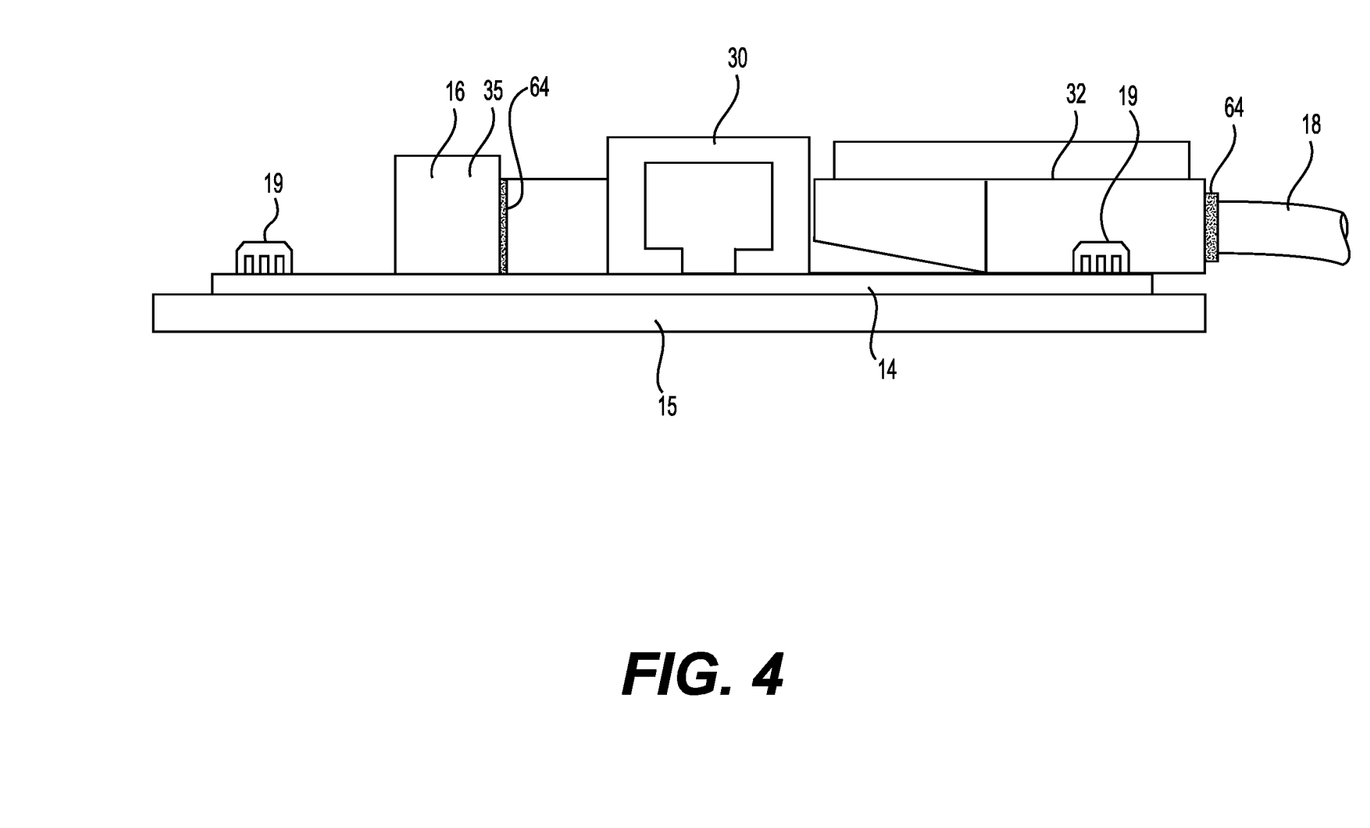
FIG. 4 is a right side elevation view of the PCB and associated components mounted to part of a housing of the sensing module.
Figure 8:
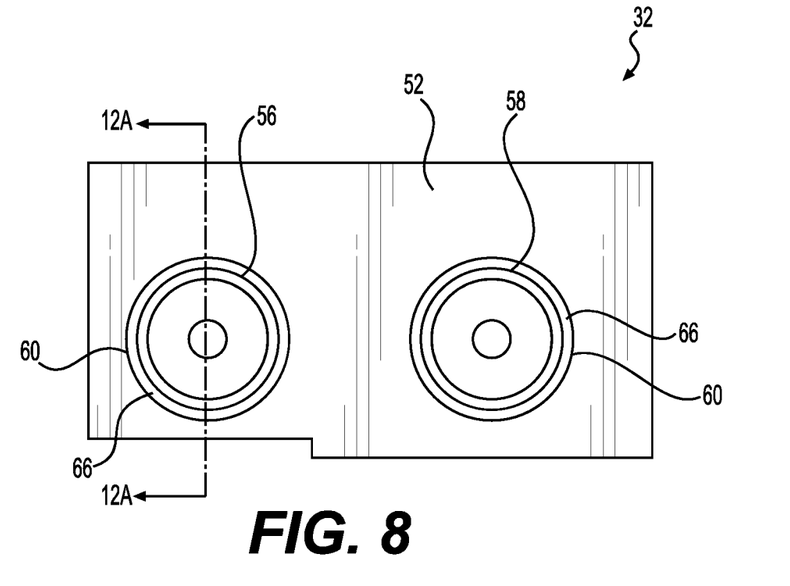
FIG. 8 is a front elevation view of the interface member of FIG. 7.
Figure 9:
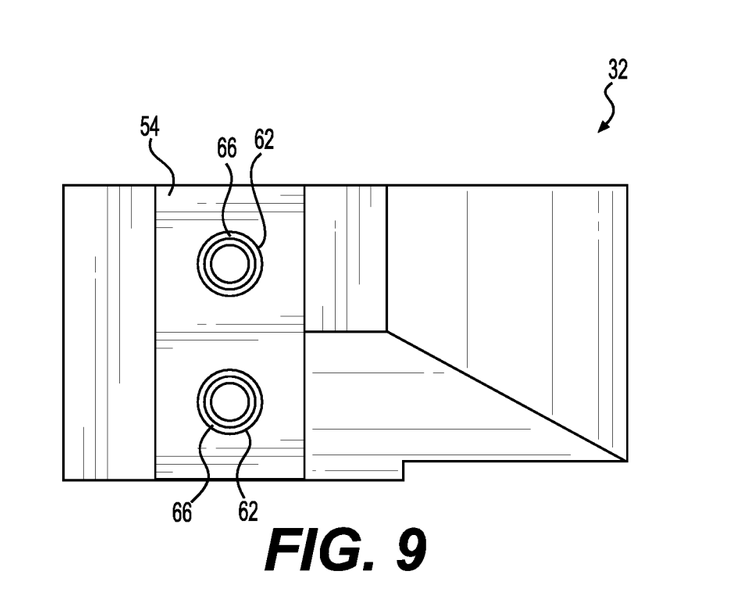
FIG. 9 is a rear elevation view of the interface member of FIG. 7.
Figure 10:
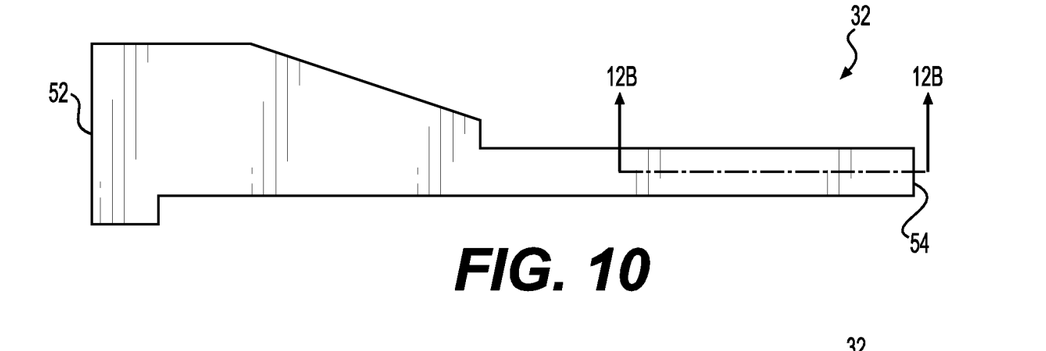
FIG. 10 is a top plan view of the interface member of FIG. 7.
Figure 11:
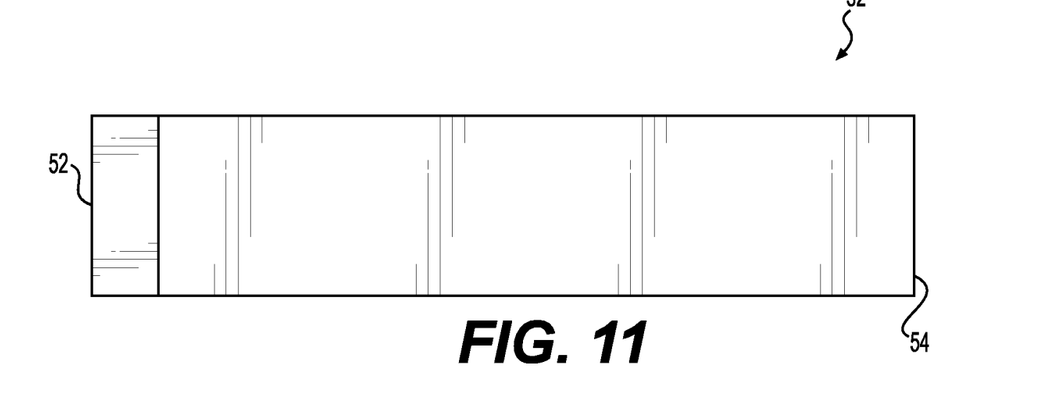
FIG. 11 is a left side elevation view of the interface member of FIG. 7.

In order to further decrease the risk of a leak, as shown in FIGS. 2 to 4, resin 64 is applied at the interface between the interface member 32 and the tubing 18, 20 and at the interface between the interface member 32 and the pressure differential sensor 16. The resin 64 thus surrounds a perimeter of the tubing 18 and the tubing 20 at the interface with the interface member 32. Similarly, the resin 64 surrounds the perimeter of the interface member 32 at the end 54 thereof. To promote the effectiveness of the resin 64, the channel inlets 60 and the channel outlets 62 are chamfered and thus have chamfered edges 66 (FIGS. 7 to 9). The resin 64 is thus able to partially penetrate the channels 56, 58 at the chamfered edges 66. In other embodiments, the resin 64 may be omitted.

The reduced risk of leaks enabled by the configuration of the channels 56, 58 of the interface member 32 may be useful to ensure that accurate pressure readings are observed by the pressure differential sensor 16. This may be particularly important in applications where small pressures are observed and thus even a minor leak can impart a large error into the pressure readings.

Furthermore, as shown in FIGS. 2 and 3, the first end 52 of the interface member 32 is abutted by the cover 17 of the housing 12 while the second end 54 is abutted by the pressure differential sensor 16. As such, the interface member 32 is collaboratively retained in place by the pressure differential sensor 16 and the housing 12. This may be helpful to reduce or otherwise prevent mechanical strain being exerted at the interface between the interface member 32 and the pressure differential sensor 16 and at the interface between the interface member 32 and the tubing 18, 20. In turn, this can reduce the risk of leaks at the interfaces of the interface member 32.

The interface member 32 comprises a polymeric material. In this embodiment, the interface member 32 is formed by additive manufacturing. More particularly, the interface member 32 is formed via stereolithography. It is contemplated that, in other embodiments, the interface member 32 may be formed by molding.

Furthermore, while in this embodiment the interface member 32 is a separate component from the housing 12, it is contemplated that, in alternative embodiments, the interface member 32 may be integrally formed with the housing 12. That is, the housing 12 and the interface member 32 may form a single component. In such embodiments, the housing 12 and the interface member 32 may be molded together for example.

Figure 14:
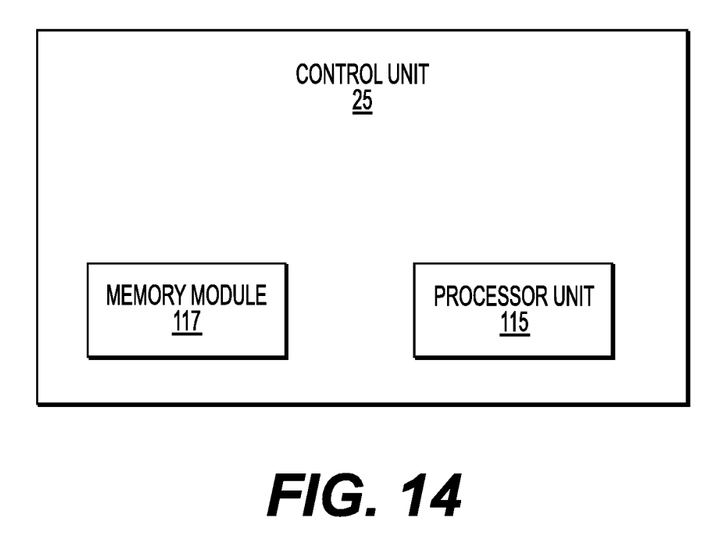
FIG. 14 is a block diagram of a control unit of the fluid circuit monitoring system of FIG. 1.

In this embodiment, as shown in FIG. 14, the control unit 25 is a computer having a processor unit 115 for carrying out executable code, and a non-transitory memory module 117 that stores the executable code in a non-transitory medium (not shown) included in the memory module 117. The processor unit 115 includes one or more processors for performing processing operations that implement functionality of the control unit 25. The processor unit 115 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory module 117 may be a semiconductor memory (e.g., read-only memory (ROM) and/or random-access memory (RAM)), a magnetic storage medium, an optical storage medium, and/or any other suitable type of memory. While the control unit 25 represented as being one entity in this implementation, it is understood that the control unit 25 could comprise separate entities.

The control unit 25 is operatively connected to the pressure differential sensor 16 for receiving from the pressure differential sensor 16 a signal representative of the pressure differential measured by the pressure differential sensor 16. Notably, a connecting link 51 interconnects the connector 30 to the control unit 25 such that the PCB 14 is in communication with the control unit 25. In other words, in this embodiment, the control unit 25 of the fluid circuit monitoring system 10 is located remotely of the housing 12.

In a similar manner, the control unit 25 is operatively connected to the temperature probes 45, 47 such as to receive from the temperature probes 45, 47 respective signals representative of the fluid temperatures at the junctions 22, 24. Based on these temperatures, the control unit 25 is operable to determine a temperature differential between the junctions 22, 24.

The control unit 25 thus actively tracks the evolution of the pressure differential and the temperature differential between the junctions 22, 24 (i.e., the inlet and the outlet of the fluid circuit). Based on the pressure and temperature differentials, the control unit 25 can then determine the fluid flow rate within the fluid circuit. The control unit 25 thus records the determined fluid flow rate and the associated pressure and temperature differentials in order to keep a log thereof. Based on the recorded values of one or more of the fluid flow rate, the pressure differential and the temperature differential, the control unit 25 can determine if the fluid circuit requires maintenance. For example, if the fluid flow rate decreases below a certain threshold value, the control unit 25 may determine that maintenance of the fluid circuit is required. Similarly, if the pressure differential decreases below a certain threshold pressure differential value or if the temperature differential increases above a certain threshold temperature differential value, the control unit 25 may determine that maintenance of the fluid circuit is required.

The control unit 25 is connected to a display unit (not shown) in order to alert an operator when the control unit 25 determines that maintenance of the fluid circuit is required. The recorded values of the fluid flow rate, the pressure differential and the temperature differential may also be displayed such that the operator can be made aware of these values.

The operator may thus intervene and conduct maintenance of the fluid circuit (e.g., by clearing deposits in the fluid circuit) before the fluid circuit is subject to failure (e.g., inoperable blockage in the fluid circuit). The fluid circuit monitoring system 10 thus allows the operator to conduct preventive maintenance of the fluid circuit rather than reactive maintenance thereof.

While the heat exchanger 40 in this example of implementation is a water block, the fluid circuit monitoring system 10 may be used with any other suitable type of heat exchanger. Furthermore, while a single heat exchanger 40 has been represented here for simplicity, in practice a plurality of heat exchanging components such as a number of water blocks are associated with a different server 50 of a server rack (not shown) and share the same fluid circuit and thus the fluid circuit monitoring system 10 monitors the fluid circuit shared by the water blocks. More particularly, the junction 22 is located at the inlet of a selected one of the water blocks (a "witness" water block) of the fluid circuit and the junction 24 is located at the outlet of that witness water block of the fluid circuit.

In some embodiments, a server rack can be associated with multiple fluid circuit monitoring systems 10. For instance, each server 50 of the server rack can be monitored by its own fluid monitoring system 10. In some cases, each server 50 can have multiple heat exchangers 40 (e.g., multiple water blocks), with each heat exchanger 40 positioned to cool a particular server component 55 of the server 50 and monitored by its own fluid circuit monitoring system 10 (i.e., a fluid circuit monitoring system 10 for each heat exchanger 40 of the server 50). This may be useful for example where accrued monitoring is desired such as when a given server component 55 is particularly expensive.

Thus, in the context of a server rack which houses a number of the servers 50, the fluid circuit monitoring system 10 offers a convenient and size-efficient solution for actively monitoring the condition of the fluid circuit integrating the various heat exchanging components housed within the servers 50. This may be particularly beneficial for data centers which implement a significant quantity of server racks and have limited space for including a fluid circuit monitoring system therein.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A fluid circuit monitoring system for monitoring a fluid circuit, comprising:
    a pressure sensor for sensing a pressure of fluid flowing in the fluid circuit, the pressure sensor comprising a sensing port configured to receive fluid therein;
    a temperature sensing unit comprising:
        a first temperature probe for sensing a first temperature of fluid flowing into the fluid circuit, and
        a second temperature probe for sensing a second temperature of fluid flowing out of the fluid circuit;
    an interface member fluidly communicating the fluid circuit to the pressure sensor, the interface member extending from a first end to a second end, the interface member comprising a channel having:
        a channel inlet in fluid communication with the fluid circuit and configured to be coupled thereto via tubing, and
        a channel outlet connected to the sensing port of the pressure sensor;
    a control unit operatively connected to the pressure sensor and the temperature sensing unit for receiving;
        a signal, from the pressure sensor, representative of the pressure measured by the pressure sensor,
        the first temperature from the first temperature probe, and
        the second temperature from the second temperature probe;
    a printed circuit board (PCB), wherein:
        the interface member is supported by the PCB;
        the pressure sensor is mounted to and in communication with the PCB; and
        the control unit is in communication with the PCB;
    a housing supporting the PCB and at least partly enclosing the PCB, the pressure sensor and the interface member therein; and
    wherein the first end of the interface member is abutted by the pressure sensor and the second end of the interface member is abutted by the housing such that the interface member is collaboratively retained in place by the pressure sensor and the housing.

2. The fluid circuit monitoring system of claim 1, wherein:
the pressure sensor is a pressure differential sensor;
the sensing port is a first sensing port;
the pressure differential sensor comprises a second sensing port configured to receive fluid therein;
the channel is a first channel;
the channel inlet and the channel outlet are a first channel inlet and a first channel outlet;
the first channel inlet is fluidly connected at a first location of the fluid circuit;
the interface member comprises a second channel having:
    (i) a second channel inlet fluidly connected at a second location of the fluid circuit and configured to be coupled thereto via tubing; and
    (ii) a second channel outlet connected to the second sensing port of the pressure differential sensor,
the signal received by the control unit, from the pressure differential sensor, is representative of a pressure differential between the first location and the second location of the fluid circuit as measured by the pressure differential sensor.

3. The fluid circuit monitoring system of claim 2,
wherein the first temperature probe is positioned at the first location of the fluid circuit; and
the second temperature probe is positioned at the second location of the fluid circuit.

4. The fluid circuit monitoring system of claim 3, wherein the control unit is operable to:
    determine, based on the pressure differential and the a temperature differential between the first temperature and the second temperature, a fluid flow rate within the fluid circuit; and
    record the determined fluid flow rate.

5. The fluid circuit monitoring system of claim 4, wherein the control unit is operable to determine, based on recorded values of the fluid flow rate, if the fluid circuit requires maintenance.

6. The fluid circuit monitoring system of claim 3, wherein the control unit is operable to determine, based on the first temperature and the second temperature, a temperature differential between the first and second locations of the fluid circuit.

7. The fluid circuit monitoring system of claim 2, wherein:
the first channel inlet and the second channel inlet are aligned along a generally horizontal axis; and
the first channel outlet and the second channel outlet are aligned along a generally vertical axis.

8. The fluid circuit monitoring system of claim 1, wherein the channel has outwardly-expanding tapered end portions for sealingly engaging the sensing port of the pressure sensor and the tubing.

9. The fluid circuit monitoring system of claim 1, wherein a resin is applied at an interface between the interface member and the pressure sensor.

10. The fluid circuit monitoring system of claim 1, wherein the interface member is integrally formed with the housing.

11. The fluid circuit monitoring system of claim 1, wherein:
the channel inlet has a first diameter;
the channel outlet has a second diameter; and
the first diameter is greater than the second diameter.

12. The fluid circuit monitoring system of claim 1, wherein the fluid circuit is in a water block, and wherein the water block is in contact with a component of a server.

13. A heat exchange system, comprising:
a heat exchanger, comprising:
a heat exchanging body; and
a fluid circuit at least partly extending within the heat exchanging body, the fluid circuit having an inlet for receiving fluid within the fluid circuit and an outlet for expelling fluid from the fluid circuit; and
a fluid circuit monitoring system for monitoring the fluid circuit of the heat exchanger, the fluid circuit monitoring system comprising:
a pressure sensor for sensing a pressure of fluid flowing in the fluid circuit, the pressure sensor comprising a sensing port configured to receive fluid therein;
an interface member fluidly communicating the fluid circuit to the pressure sensor, the interface member extending from a first end to a second end, the interface member comprising a channel having:
    a channel inlet in fluid communication with the fluid circuit and configured to be coupled thereto via tubing; and
    a channel outlet connected to the sensing port of the pressure sensor,
a control unit operatively connected to the pressure sensor for receiving, from the pressure sensor, a signal representative of the pressure measured by the pressure sensor;
a printed circuit board (PCB), wherein:
    the interface member is supported by the PCB;
    the pressure sensor is mounted to and in communication with the PCB; and
    the control unit is in communication with the PCB;
a housing supporting the PCB and at least partly enclosing the PCB, the pressure sensor and the interface member therein; and
wherein the first end of the interface member is abutted by the pressure sensor and the second end of the interface member is abutted by the housing such that the interface member is collaboratively retained in place by the pressure sensor and the housing.

14. The heat exchange system of claim 13, wherein:
the heat exchanger is a water block;
the heat exchanging body of the water block is configured to be in contact with a component to be cooled; and
the fluid circuit comprises a conduit defined by the heat exchanging body of the water block.

15. The heat exchange system of claim 13, wherein:
the pressure sensor is a pressure differential sensor;
the sensing port is a first sensing port;
the pressure differential sensor comprises a second sensing port configured to receive fluid therein;
the channel is a first channel;
the channel inlet and the channel outlet are a first channel inlet and a first channel outlet;
the first channel inlet is fluidly connected at the inlet of the fluid circuit;
the interface member comprises a second channel having:
    (i) a second channel inlet fluidly connected at the outlet of the fluid circuit and configured to be coupled thereto via tubing; and
    (ii) a second channel outlet connected to the second sensing port of the pressure differential sensor,
the signal received by the control unit, from the pressure differential sensor, is representative of a pressure differential between the inlet and the outlet of the fluid circuit as measured by the pressure differential sensor.

16. The heat exchange system of claim 13, further comprising a first temperature probe positioned to sense a first temperature of fluid flowing into the fluid circuit.

17. The heat exchange system of claim 16, wherein the first temperature probe is in communication with the PCB.

18. The heat exchange system of claim 13, further comprising a second temperature probe positioned to sense a second temperature of fluid flowing out of the fluid circuit.

19. A system comprising:
a server comprising an electronic component;
a heat exchanger in contact with the electronic component, the heat exchanger comprising:
a heat exchanging body, and
a fluid circuit at least partly extending within the heat exchanging body, the fluid circuit having an inlet for receiving fluid within the fluid circuit and an outlet for expelling fluid from the fluid circuit; and
a fluid circuit monitoring system for monitoring the fluid circuit of the heat exchanger, the fluid circuit monitoring system comprising:
a pressure sensor for sensing a pressure of fluid flowing in the fluid circuit, the pressure sensor comprising a sensing port configured to receive fluid therein,
an interface member fluidly communicating the fluid circuit to the pressure sensor, the interface member extending from a first end to a second end, the interface member comprising a channel having:
a channel inlet in fluid communication with the fluid circuit and configured to be coupled thereto via tubing; and
a channel outlet connected to the sensing port of the pressure sensor,
a control unit operatively connected to the pressure sensor for receiving, from the pressure sensor, a signal representative of the pressure measured by the pressure sensor;
a printed circuit board (PCB), wherein:
the interface member is supported by the PCB;
the pressure sensor is mounted to and in communication with the PCB; and
the control unit is in communication with the PCB, and
a housing supporting the PCB and at least partly enclosing the PCB, the pressure sensor and the interface member therein, wherein the first end of the interface member is abutted by the pressure sensor and the second end of the interface member is abutted by the housing such that the interface member is collaboratively retained in place by the pressure sensor and the housing.

20. The system of claim 19, wherein the pressure sensor is a pressure differential sensor.

* * * * *